United States Patent
Prakash et al.

(10) Patent No.: US 10,776,223 B1
(45) Date of Patent: Sep. 15, 2020

(54) SYSTEM AND METHOD FOR ACCELERATED POINT IN TIME RESTORATION

(71) Applicant: EMC IP Holding Company LLC, Hopkinton, MA (US)

(72) Inventors: Pallavi Prakash, Bangalore (IN); Shelesh Chopra, Bangalore (IN); Jaishree Balasubramanian, Bangalore (IN); Matthew Dickey Buchman, Seattle, WA (US); Krishnendu Bagchi, Bangalore (IN); Nitin Anand, Bangalore (IN); Vipin Kumar Kaushal, Bharthana Etawah (IN); Sudha Vamanraj Hebsur, Bangalore (IN); Anand Reddy, Bangalore (IN); Niketan Narayan Kalaskar, Bangalore (IN); Gajendran Raghunathan, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/395,350

(22) Filed: Apr. 26, 2019

(51) Int. Cl.
*G06F 11/14* (2006.01)
*G06F 9/455* (2018.01)

(52) U.S. Cl.
CPC ...... *G06F 11/1469* (2013.01); *G06F 9/45558* (2013.01); *G06F 11/1461* (2013.01); *G06F 2009/45575* (2013.01)

(58) Field of Classification Search
None
See application file for complete search history.

(56) References Cited

U.S. PATENT DOCUMENTS

| | | | |
|---|---|---|---|
| 8,554,918 B1 | 10/2013 | Douglis | |
| 9,256,725 B2 | 2/2016 | Oprea et al. | |
| 9,311,375 B1* | 4/2016 | Naik | G06F 16/27 |
| 9,740,577 B1* | 8/2017 | Chakraborty | G06F 11/1451 |
| 9,977,704 B1 | 5/2018 | Chopra et al. | |
| 10,216,583 B1* | 2/2019 | Krinke | G06F 16/128 |
| 2007/0239755 A1 | 10/2007 | Mahoney | |
| 2010/0122248 A1* | 5/2010 | Robinson | G06F 9/5077 718/1 |
| 2018/0225311 A1 | 8/2018 | Bandopadhyay et al. | |
| 2019/0286530 A1* | 9/2019 | Talley | G06F 9/45558 |
| 2020/0007620 A1* | 1/2020 | Das | H04L 41/0856 |
| 2020/0183652 A1 | 6/2020 | Krebs et al. | |

* cited by examiner

*Primary Examiner* — Tracy C. Chan
(74) *Attorney, Agent, or Firm* — Chamberlain, Hrdlicka, White, Williams & Aughtry

(57) ABSTRACT

A backup storage includes a persistent storage and a backup manager. The persistent storage stores virtual machine level backups and application level backups. The backup manager obtains a request for a point in time restoration of an application; identifies, based on the application, a virtual machine level backup of the virtual machine level backups that is associated with: a virtual machine that hosted an instance of the application and a first point in time prior to a restoration point in time specified by the request for the point in time restoration; identifies, based on the application, an application level backup of the application level backups that is associated with the restoration point in time; generates a point in time backup using: the identified virtual machine level backup, and the identified application level backup; and services the request using the point in time backup.

20 Claims, 14 Drawing Sheets

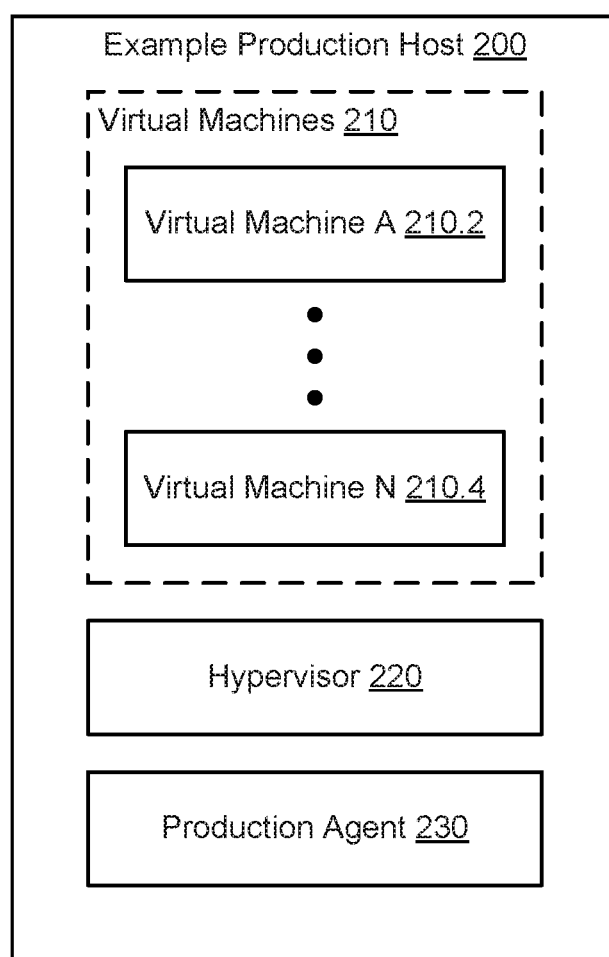
FIG. 2.1

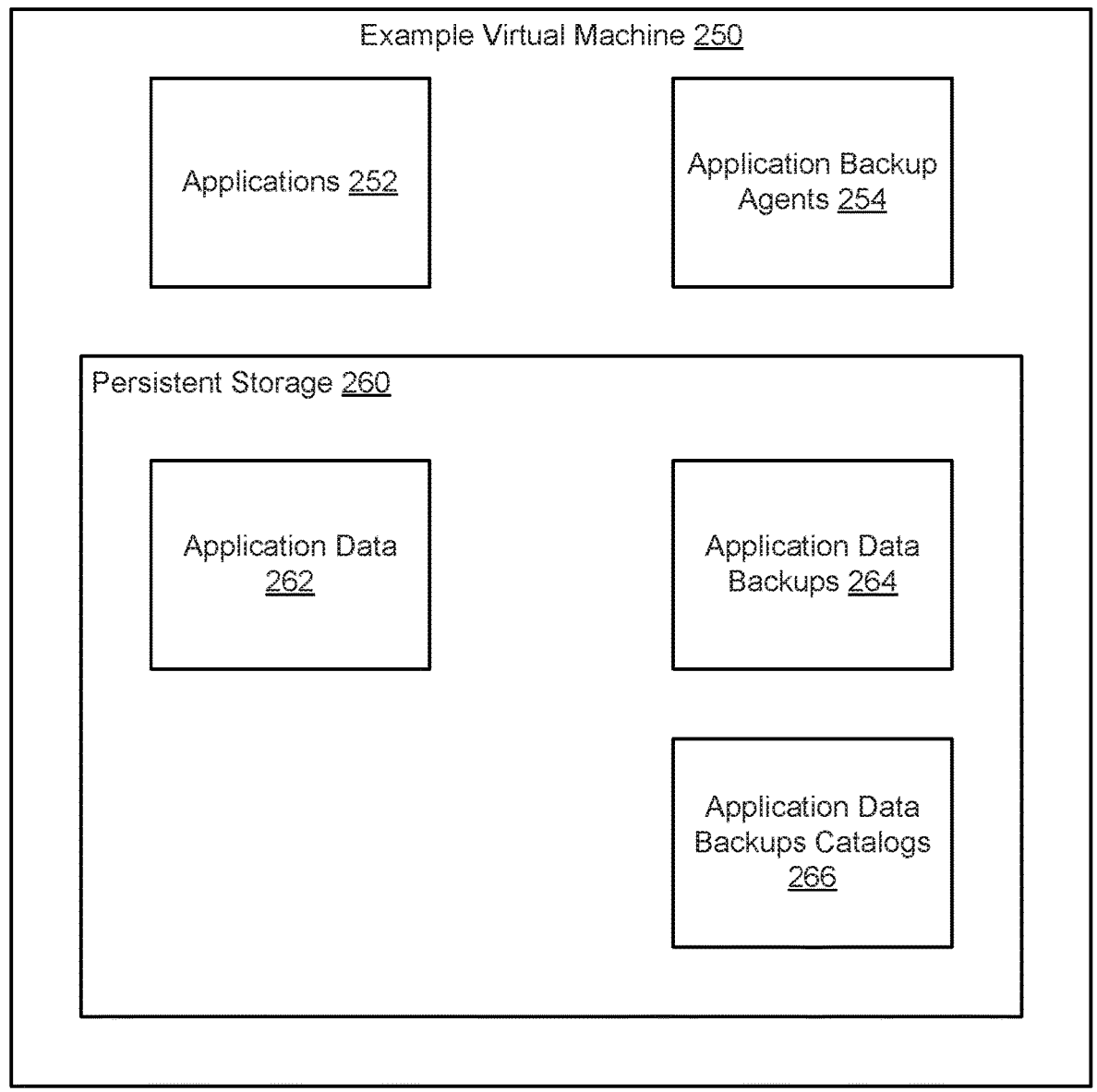
FIG. 2.2

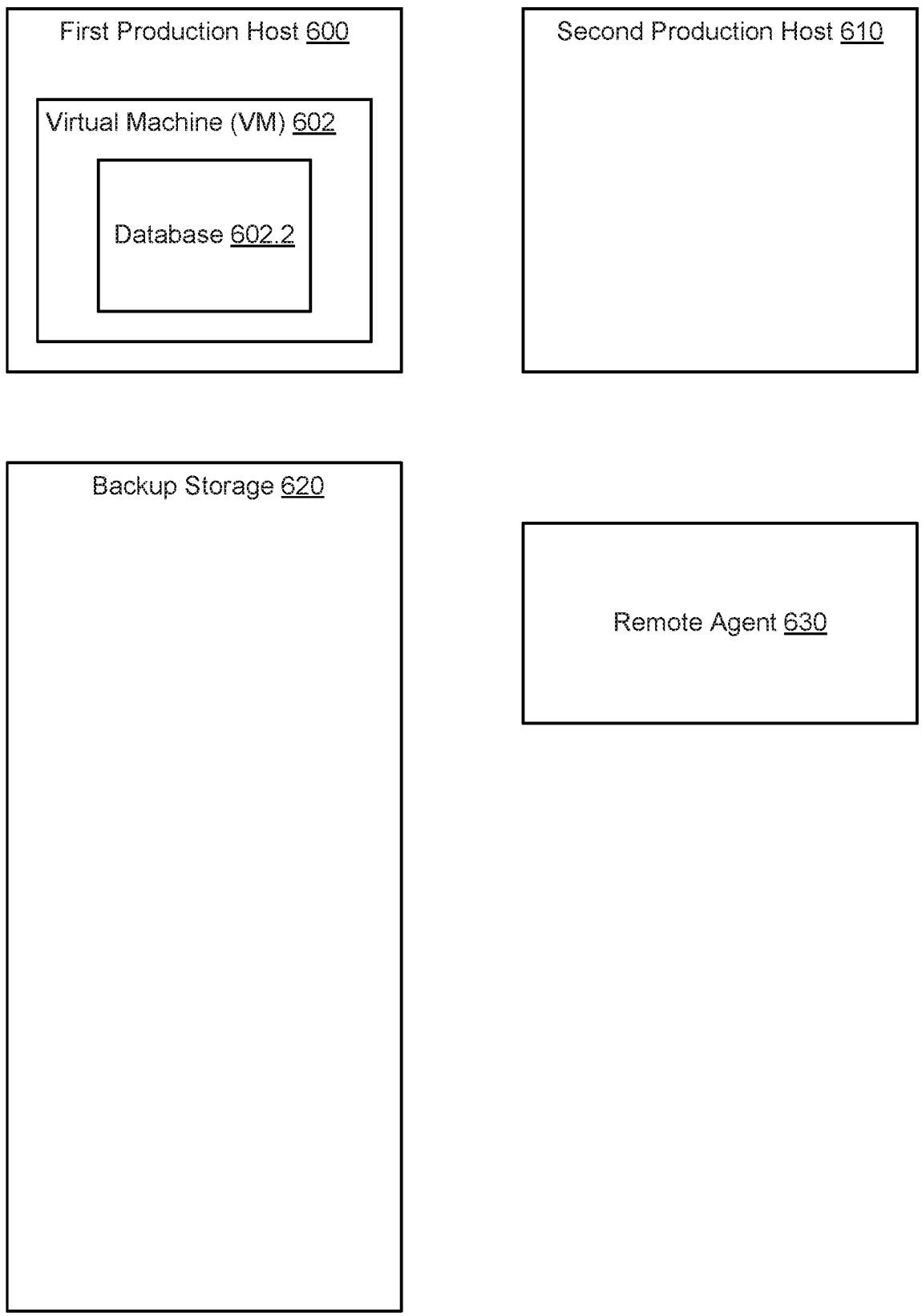
FIG. 6.1

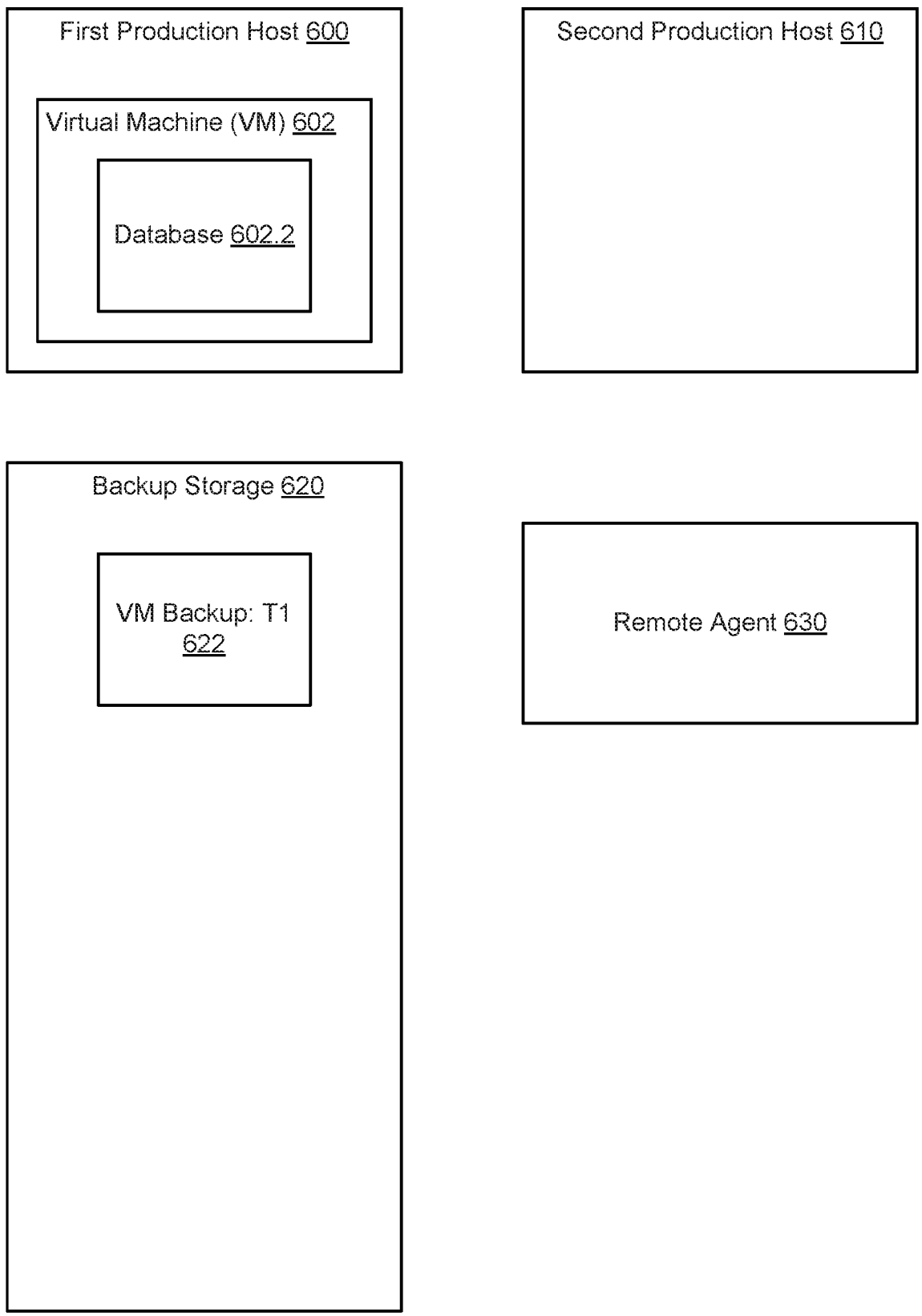
FIG. 6.2

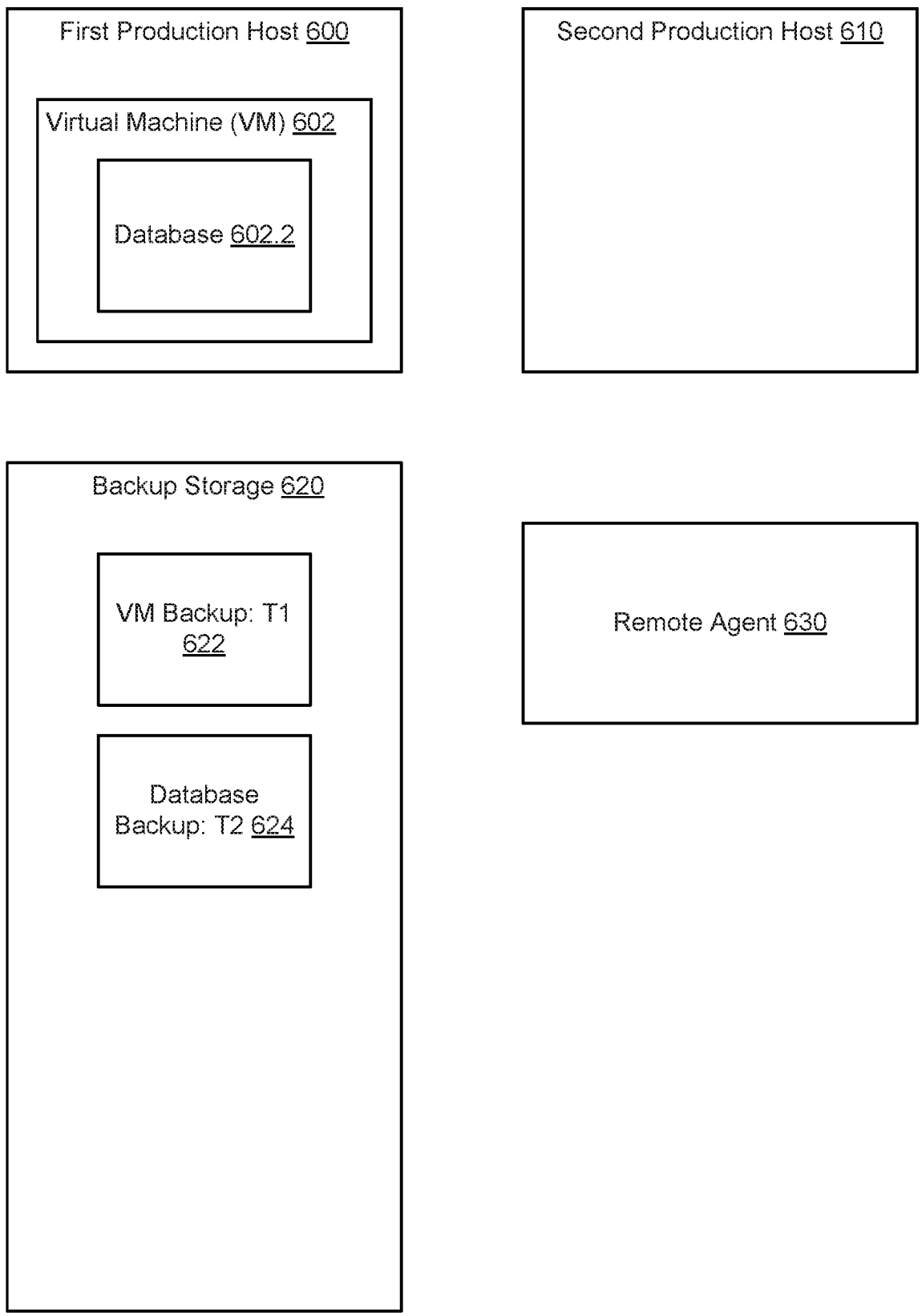
FIG. 6.3

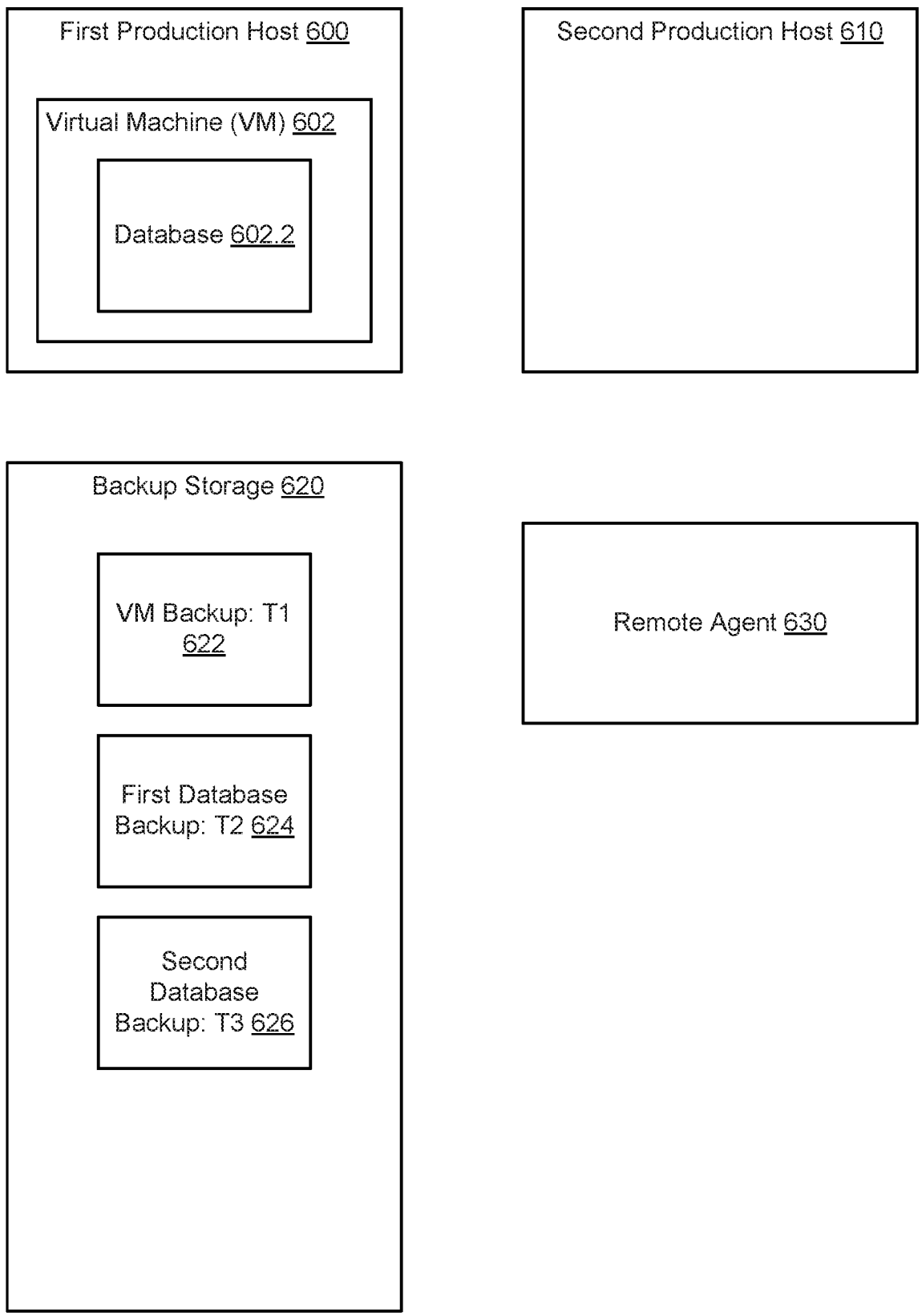
FIG. 6.4

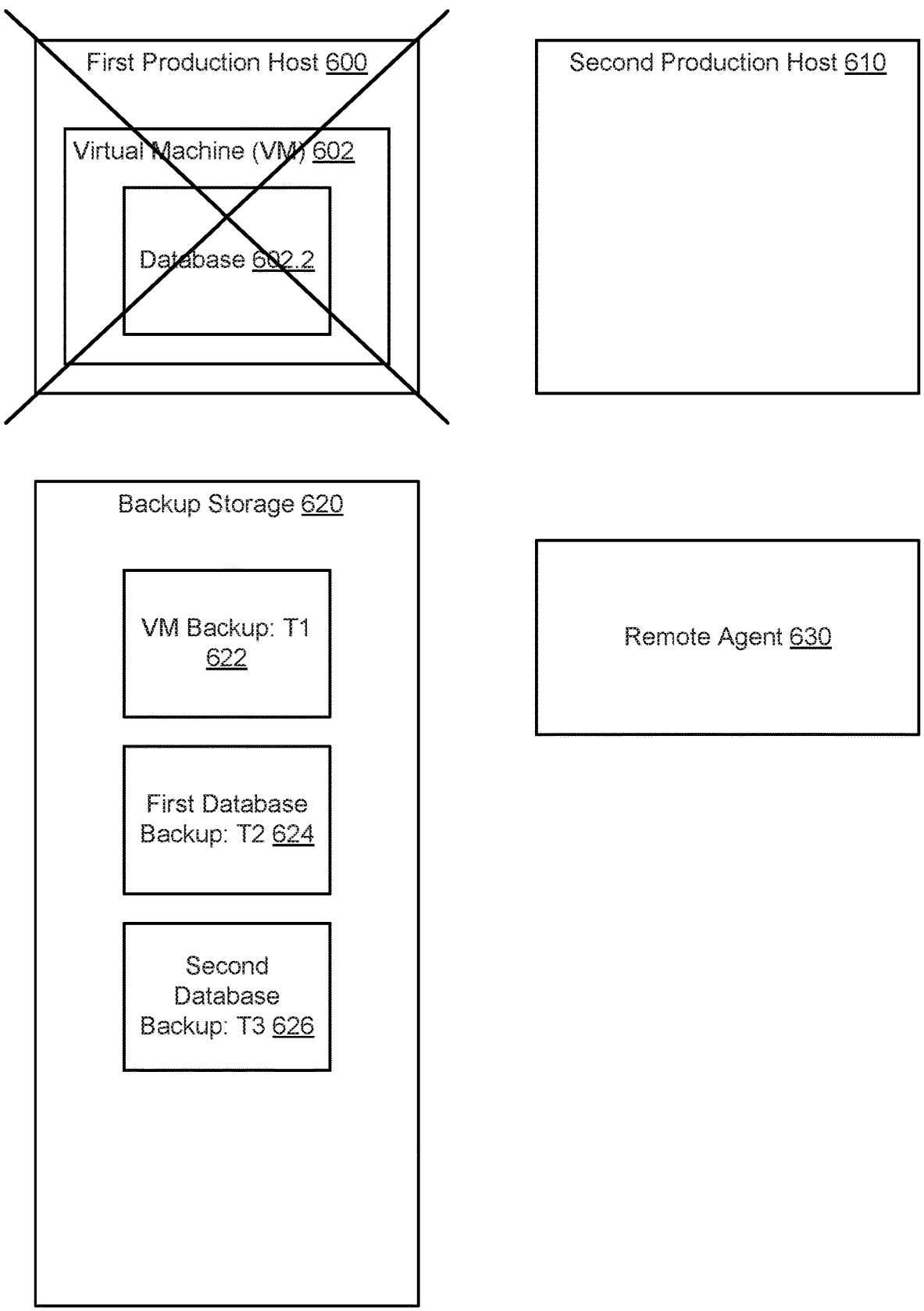
FIG. 6.5

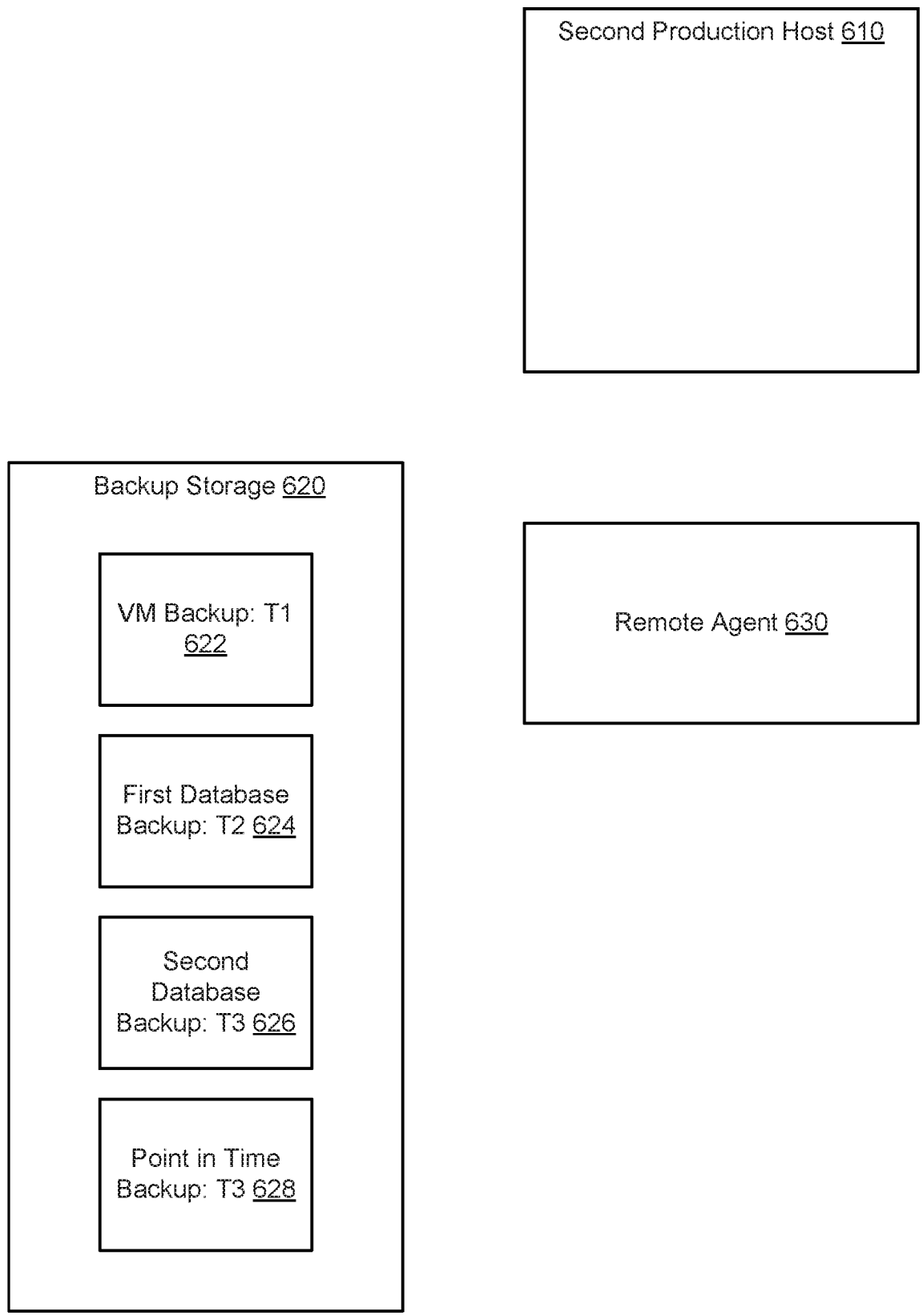
FIG. 6.6

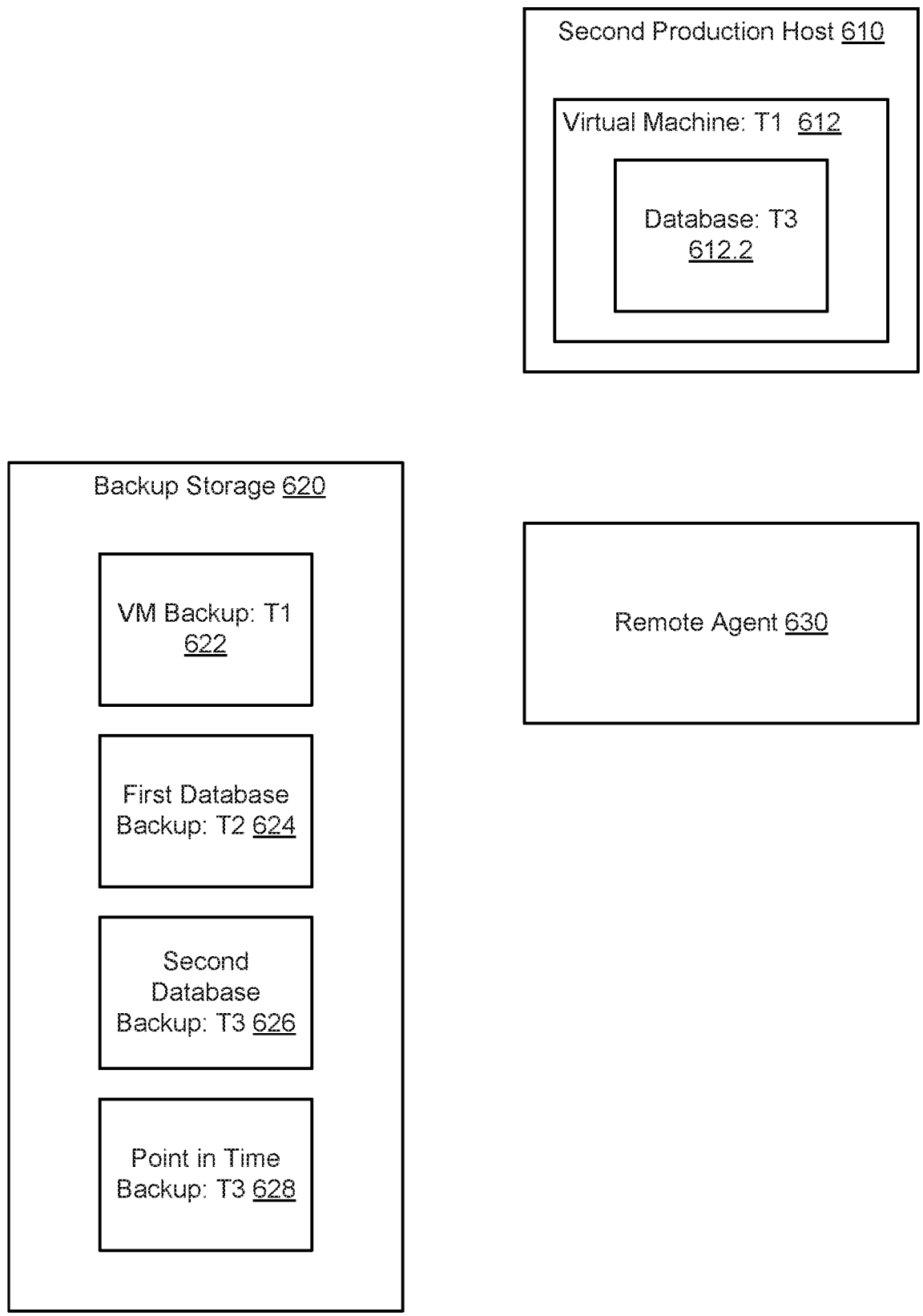
FIG. 6.7

SYSTEM AND METHOD FOR ACCELERATED POINT IN TIME RESTORATION

BACKGROUND

Computing devices may generate data during their operation. For example, applications hosted by the computing devices may generate data used by the applications to perform their functions. Such data may be stored in persistent storage of the computing devices. Failure of the persistent storage may result in data loss.

SUMMARY

In one aspect, a backup storage in accordance with one or more embodiments of the invention includes a persistent storage and a backup manager. The persistent storage stores virtual machine level backups and application level backups. The backup manager obtains a request for a point in time restoration of an application; identifies, based on the application, a virtual machine level backup of the virtual machine level backups that is associated with: a virtual machine that hosted an instance of the application and a first point in time prior to a restoration point in time specified by the request for the point in time restoration; identifies, based on the application, an application level backup of the application level backups that is associated with the restoration point in time; generates a point in time backup using: the identified virtual machine level backup, and the identified application level backup; and services the request using the point in time backup.

In one aspect, a method for restoring client access to an application in accordance with one or more embodiments of the invention includes obtaining a request for a point in time restoration of the application; identifying, based on the application, a virtual machine level backup that is associated with: a virtual machine that hosted an instance of the application and a first point in time prior to a restoration point in time specified by the request for the point in time restoration; identifying, based on the application, an application level backup that is associated with the restoration point in time; generating a point in time backup using: the identified virtual machine level backup and the identified application level backup; and servicing the request using the point in time backup.

In one aspect, a non-transitory computer readable medium in accordance with one or more embodiments of the invention includes computer readable program code, which when executed by a computer processor enables the computer processor to perform a method for restoring client access to an application. The method includes obtaining a request for a point in time restoration of the application; identifying, based on the application, a virtual machine level backup that is associated with: a virtual machine that hosted an instance of the application and a first point in time prior to a restoration point in time specified by the request for the point in time restoration; identifying, based on the application, an application level backup that is associated with the restoration point in time; generating a point in time backup using: the identified virtual machine level backup and the identified application level backup; and servicing the request using the point in time backup.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a diagram of an example production host in accordance with one or more embodiments of the invention.

FIG. 2.2 shows a diagram of an example virtual machine in accordance with one or more embodiments of the invention.

FIGS. 6.1-6.7 show a non-limiting example of a system in accordance with embodiments of the invention.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for accelerating access to data in response to component failures of a distributed system. A system in accordance with embodiments of the invention may include a backup storage that provides point in time backup generation services for generating point in time backups. A point in time backup may be synthesized using different types of backups associated with different previous states of a now-failed entity. The resulting point in time backup may reflect data associated with different states of the now-failed entity. Thus, the point in time backup may not reflect an actual previous state of an entity.

In one or more embodiments of the invention, the point in time backup may be used to provide accelerated access to data hosted by a now-failed entity. For example, the point in time backup may be utilized to provide a single step restoration of the now-failed entity. In contrast, contemporary methods for performing restorations may rely on using multiple steps for restoring different portions of an entity at different levels of granularity to provide access to data hosted by the now-failed entity. The aforementioned contemporary method may be time consuming and computationally expensive.

Figure 1:
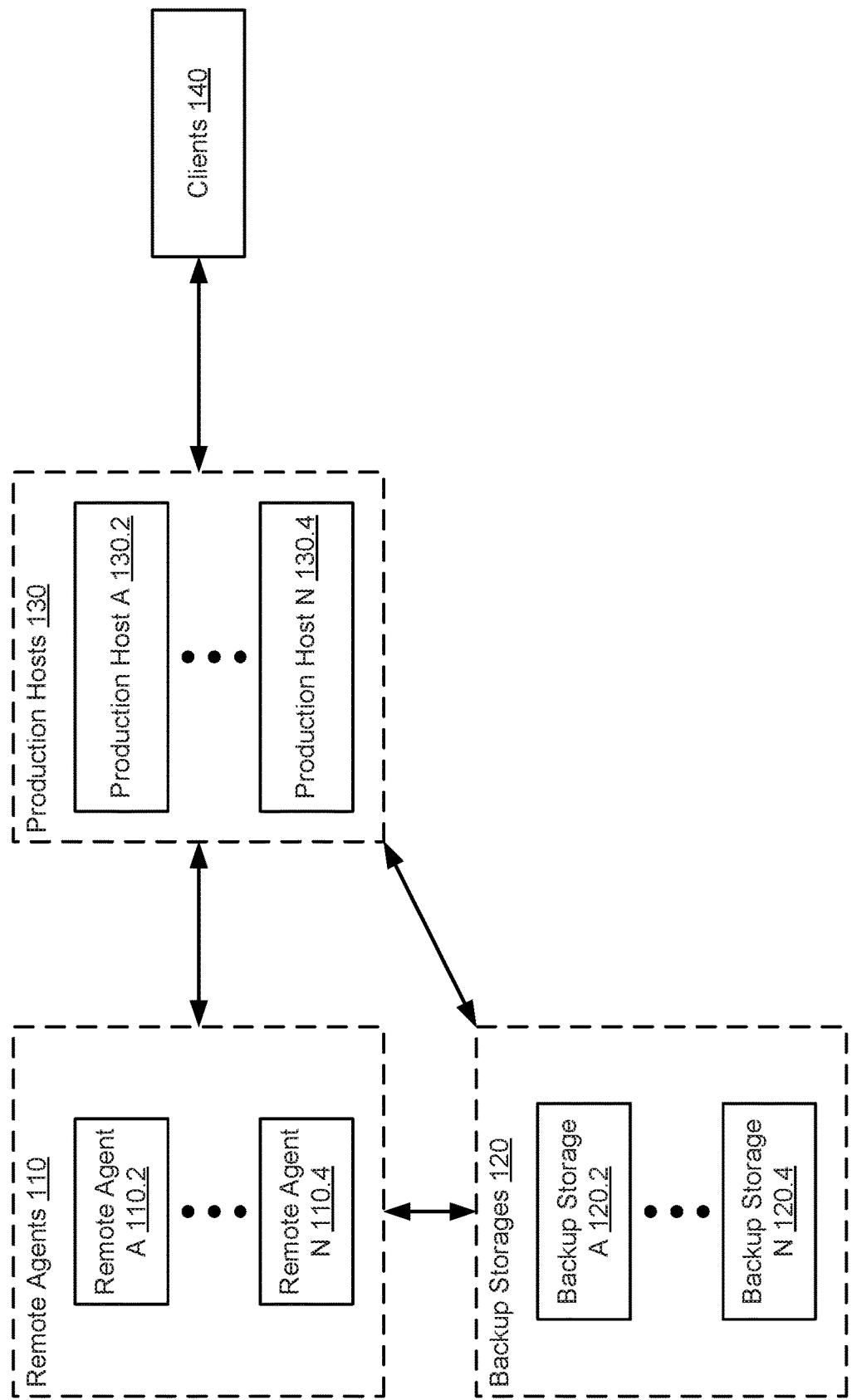
FIG. 1 shows a diagram of a system in accordance with one or more embodiments of the invention.

FIG. 1 shows an example system in accordance with one or more embodiments of the invention. The system may include clients (140) that obtain services from virtual machines and/or applications hosted by production hosts (130). For example, the production hosts (130) may host virtual machines that host applications. The clients (140) may utilize application services of the applications. The applications may be, for example, database applications, electronic communication applications, file storage applications, and/or any other type of application that may provide services to the clients (140). By utilizing such services, data that is relevant to the clients (140) may be stored in the production hosts (130).

To improve the likelihood that data stored in the production hosts (130) is available for future use, backups of the production hosts (130) may be generated and stored in the backup storages (120). A backup of one of the production hosts (130) may include data that may be used to restore all, or a portion, of the production host, or all, or a portion, of an entity hosted by the production host, to a previous state. Thus, if data hosted by one of the production hosts (130) is lost, access to the data may be restored by restoring all, or a portion, of the production host using information stored in the backup storages (120).

The system may also include remote agents (110) that provide data protection services to the production hosts (130). The data protection services may include orchestrating generation and storage of backups in the backup storages and/or orchestrating restorations using the data stored in the backup storages (120). Performing a restoration of a production host (e.g., 130.2, 130.4) may return the production host, or an entity hosted by the production host, to a previous state.

The components of the system illustrated in FIG. 1 may be operably connected to each other and/or operably connected to other entities (not shown) via any combination of wired and/or wireless networks. Each component of the system illustrated in FIG. 1 is discussed below.

The clients (140) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or all, or portion, of the methods illustrated in FIGS. 4-5. The clients (140) may be other types of computing devices without departing from the invention. For additional details regarding computing devices, refer to FIG. 7.

The clients (140) may be logical devices without departing from the invention. For example, the clients (140) may be virtual machines that utilize computing resources of any number of physical computing devices to provide the functionality of the clients (140). The clients (140) may be other types of logical devices without departing from the invention.

In one or more embodiments of the invention, the clients (140) utilize application services provided by production hosts (130). For example, the clients (140) may utilize database services, electronic communication services, file storage services, or any other type of computer implemented service provided by applications hosted by the production hosts (130). By utilizing the aforementioned services, data that is relevant to the clients (140) may be stored as part of application data of the applications hosted by the production hosts (130).

For example, consider a scenario in which a client utilizes file storage services provided by an application of the production hosts (130) by uploading an image to an application hosted by the production hosts (130). In response to receiving the uploaded image, the application may store a copy of the image locally in the production hosts (130). At a future point in time, the client that uploaded the image, or another entity, may desire to retrieve a copy of the image from the production hosts (130) and thereby render data, i.e., the copy of the image sort of the production hosts (130), stored in the production hosts (130) to be relevant to the clients (140). One or more embodiments of the invention may improve the likelihood that data that is relevant to the clients (140) and stored in the production hosts (130) is retrievable from the production hosts (130) at future points in time. Embodiments of the invention may provide such functionality by generating and storing backups of the production hosts, or portions of the production hosts, in the backup storages (120).

In one or more embodiments of the invention, the production hosts (130) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or all, or portion, of the methods illustrated in FIGS. 4-5. The production hosts (130) may be other types of computing devices without departing from the invention. For additional details regarding computing devices, refer to FIG. 7.

In one or more embodiments of the invention, the production hosts (130) are distributed computing devices. As used herein, a distributed computing device refers to functionality provided by a logical device that utilizes the computing resources of one or more separate and/or distinct physical computing devices. For example, in one or more embodiments of the invention, the production hosts (130) may be distributed devices that include components distributed across any number of separate and/or distinct computing devices. In such a scenario, the functionality of the production hosts (130) may be performed by multiple, different computing devices without departing from the invention.

A system in accordance with one or more embodiments of the invention may include any number of production hosts (e.g., 130.2, 130.4) without departing from the invention. For example, a system may include a single production host (e.g., 130.2) or multiple production hosts (e.g., 130.2, 130.4).

In one or more embodiments of the invention, the production hosts (130) provide services to the clients (140). The services may be any type of computer implemented service such as, for example, database services, electronic communication services, data storage services, and/or instant messaging services. When providing such services to the clients (140), data that is relevant to the clients (140) may be stored in persistent storage of the production hosts (130).

In one or more embodiments of the invention, the production hosts (130) perform backup services such as, for example, generating and storing backups in backup storages (120). By storing backups in the backup storages (120), copies of data stored in persistent storage of the production hosts (130) may be redundantly stored in the backup storages (120). By redundantly storing copies of data in both the production hosts (130) and the backup storages (120), it may be more likely that the stored data will be able to be retrieved at a future point in time. For example, if a production host (e.g., 130.2) suffers a catastrophic failure or other type of data loss/corruption event, the data on the production host's persistent storage may be lost. However, because copy of the data may be stored in the backup storages (120), it may be possible to retrieve the data for use after the catastrophic failure. Thus, embodiments of the invention may improve the reliability of data storage in a distributed system.

In one or more embodiments of the invention, the production hosts (130) perform backup services under the direction of the remote agents (110). For example, the production hosts (130) may receive instructions from the remote agents with respect to backup services and take action in response to instructions. In one or more embodiments of the invention, each of the production hosts (130) may include one or more production agents that are tasked with performing backup services in accordance with instructions sent by remote agents (110). For example, the remote agents (110) may send instructions to the production agents regarding the performance of backup services. In response to receipt of the instructions, the production hosts (130) may act to perform backup services in compliance with the received instructions. By doing so, backups of the production hosts (130) may be generated and stored in backup storage. Similarly, restorations of productions hosts (130) may be performed using the previously stored information in the backup storages (120). For additional details regarding the production hosts (130), refer to FIG. 3.

In one or more embodiments of the invention, the backup storages (120) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device that cause the computing device to provide the functionality of the backup storages (120) described through this application and all, or a portion, of the methods illustrated in FIG. 4-5. The backup storages (120) may be other types of computing devices without departing from the invention. For additional details regarding computing devices, refer to FIG. 7.

In one or more embodiments of the invention, the backup storages (120) are distributed computing devices. As used herein, a distributed computing device refers to functionality provided by a logical device that utilizes the computing resources of one or more separate and/or distinct computing devices. For example, in one or more embodiments of the invention, the backup storages (120) may be distributed devices that include components distributed across any number of separate and/or distinct computing devices. In such a scenario, the functionality of the backup storages (120) may be performed by multiple, different computing devices without departing from the invention.

In one or more embodiments of the invention, the backup storages (120) provide data storage services to the production hosts (130). The data storage services may include storing of data provided by the production hosts (130) and providing of previously stored data to the production hosts (130). The system may include any number of backup storages (e.g., 120.2, 120.4) without departing from the invention. For example, the system in accordance with embodiments of the invention may only include a single backup storage (e.g., 120.2) or may include multiple backup storages (e.g., 120.2, 120.4).

In one or more embodiments of the invention, the data stored by the backup storages (120) includes backups of virtual machines and/or applications hosted by the production hosts (130). For example, the production hosts (130) may host a virtual machine that hosts a database application. To generate backup of the database, a backup of the virtual machine hosting the database may be generated and the backup may be sent to the backup storages (120) for storage. At a future point in time, it may become desirable to restore the state of the database managed by the database application to a previous state. To do so, the previously stored backup of the virtual machine stored in the backup storages (120) may be retrieved. The retrieved backup may be used to restore the virtual machine hosting the database to a state associated with the backup, i.e., the desired previous state.

Additionally, application level backups may be stored in backup storages (120), rather than in virtual machine level backups. Thus, backups of the production hosts (130) may be generated at any level of granularity with respect to the data stored in the production hosts (130).

In one or more embodiments of the invention, the backup storages (120) generate point in time backups for restoration purposes. A point in time backup is a backup synthesized using one or more virtual machine level backups and one or more application level backups. The point in time backup may be used to provide accelerated access to particular application data. In contrast, a traditional restoration process, which is computationally expensive and time consuming, may include sending all relevant backups to a production host which, in turn, uses the multiple backups to fully restore a virtual machine for data access purposes.

While described above as storing backups of virtual machines, applications, and/or production hosts (130), the backup storages (120) may store other types of data from the production hosts (130), or other entities, without departing from the invention. For example, the backup storages (120) may store archives or other data from the clients (140) or other entities. For additional details regarding backup storages, refer to FIG. 3

In one or more embodiments of the invention, the remote agents (110) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device that cause the computing device to provide the functionality of the remote agents (110) described through this application and all, or a portion, of the methods illustrated in FIG. 4-5.

The remote agents (110) may be other types of computing devices without departing from the invention. For additional details regarding computing devices, refer to FIG. 7.

In one or more embodiments of the invention, the remote agents (110) are distributed computing devices. As used herein, a distributed computing device refers to functionality provided by a logical device that utilizes the computing resources of one or more separate and/or distinct computing devices. For example, in one or more embodiments of the invention, the remote agents (110) may be distributed devices that include components distributed across any number of separate and/or distinct computing devices. In such a scenario, the functionality of the remote agents (110) may be performed by multiple, different computing devices without departing from the invention.

In one or more embodiments of the invention, the remote agents (110) orchestrate provisioning of backup services to the production hosts (130). For example, the remote agents (110) may initiate the process of backup generation for the production hosts (130) and storage of the generated backups in the backup storages (120). Additionally, the remote agents (110) may orchestrate restoration of the production hosts (130) using backups stored in the backup storages (120). For example, remote agents (110) may initiate copying of backups from the backup storages to the production hosts and initiation of restoration using the copied backups. Similarly, the remote agents (110) may initiate generation of point in time backups and use of such backups in providing rapid access to data and/or applications. The system of FIG. 1 may include any number of remote agents (e.g., 110.2, 110.4).

In one or more embodiments of the invention, the remote agents (110) optimize the provisioning of restorations services to the production hosts (130). For example, the remote agents (110) may analyze the necessity of accelerating access to data and/or applications that have been made inaccessible due to a production host failure. Such determinations may be made based on client access patterns, the relative importance of access to data and/or applications for system level functionality, and/or other factors. By doing so, embodiments of the invention may: (i) reduce the time required for accessing important data and/or applications, (ii) marshal limited computing resources for providing computer implemented services to the clients, and (iii) improve the availability of system level functionality provided by cooperative efforts of the production hosts (130).

While the system of FIG. 1 has been described and illustrated as including a limited number of components for the sake of brevity, a system in accordance with embodiments of the invention may include additional, fewer, and/or different components than those illustrated in FIG. 1 without departing from the invention.

As discussed above, production hosts may host virtual machines, applications, or other entities that provide services to the clients. FIG. 2.1 shows a diagram of an example production host (200) in accordance with one or more embodiments of the invention. The example production host (200) may be similar to any of the production hosts (130, FIG. 1). As discussed above, the example production hosts (200) may provide: (i) application services to the clients and (ii) backup services to the entities that provide the application services to the clients.

To provide the aforementioned functionality of the example production host (200), the example production host (200) may include virtual machines (210), a hypervisor (220), and a production agent (230). Each component of the example production host (200) is discussed below.

The virtual machines (210) may be applications. For example, the virtual machines (210) may be applications executing using physical computing resources of the example production host (200). In other words, each of the virtual machines (210) may be implemented as computer instructions stored on a persistent storage that when executed by a processor of the example production host (200) give rise the functionality of the respective virtual machine. The example production host (200) may host any number of virtual machines (e.g., 210.2, 210.4) without departing from the invention.

Each of the virtual machines (210) may host any number of applications. The applications may provide application services to clients or other entities. For example, the applications may be database applications, electronic communication applications, filesharing applications, and/or other types of applications. Each of the virtual machines (210) may host any number of applications without departing from the invention.

Each of the applications may perform similar or different functions. For example, a first application may be a database application and a second application may be an electronic communications application. In another example, a first application may be a first instance of a database application and a second application may be a second instance of the database application.

In one or more embodiments of the invention, all, or portion, of the applications provide application services to clients. The provided services may correspond to the type of application of each of the applications. When providing application services to the clients, data that is relevant to the clients may be received by and/or generated by the applications. The applications may store such relevant data as part of the application data associated with respective applications in persistent storage.

In some embodiments of the invention, portions, or all, of the application data may be stored remotely from the example production host (200). For example, the application data may be stored in a second production host, or another entity, that does not host the applications. The application data may be stored in other locations without departing from the invention.

While the applications have been described above as being hosted by the virtual machines (210), the applications may not be hosted by virtual machines without departing from the invention. For example, the applications may be executing natively on the example production host (200) rather than in a virtualized resource. For additional details regarding the virtual machines (210), refer to FIG. 2.2.

The hypervisor (220) may manage execution of the virtual machines (210). The hypervisor (220) may instantiate and/or terminate any of the virtual machines (210). The hypervisor (220) may also allocate computing resources of the example production host (200) to each of the virtual machines (e.g., 210.2, 210.4).

For example, the hypervisor (220) may allocate a portion of the persistent storage of the example production host (200). Any quantity of storage resources of the persistent storage may be allocated in any manner in any scheme among the virtual machines (e.g., 210.2, 210.4).

While discussed with respect to storage resources, the hypervisor (220) may allocate other types of computing resources to the virtual machines (210), and/or other entities hosted by the example production host (200), without departing from the invention. For example, the hypervisor (220) may allocate processor cycles, memory capacity, memory bandwidth, and/or network communication bandwidth among the virtual machines (210) and/or other entities hosted by the example production host (200).

In one or more embodiments of the invention, the hypervisor (220) is a hardware device including circuitry. The hypervisor (220) may be, for example, a digital signal processor, a field programmable gate array, or an application specific integrated circuit. The hypervisor (220) may be other types of hardware devices without departing from the invention.

In one or more embodiments of the invention, the hypervisor (220) is implemented as computing code stored on a persistent storage that when executed by a processor performs the functionality of the hypervisor (220). The processor may be a hardware processor including circuitry such as, for example, a central processing unit or a microcontroller. The processor may be other types of hardware devices for processing digital information without departing from the invention.

The production agent (230) may locally manage provisioning of backup services to the virtual machines (210). For example, the production agent (230) may orchestrate the generation of backups and storage of the generated backups in backup storage. To orchestrate the generation of backups, the production agent (230) may generate virtual machine level backups and application level backups. A virtual machine level backup may be a backup that represents the state (or difference from one state to another state) of a virtual machine at a point in time. An application level backup may be a backup that represents the state (or difference from one state to another state) of an application hosted by a virtual machine at a point in time. Different types and/or combinations of backups may be used to restore a virtual machine and/or applications hosted by a virtual machines to states associated with different points in time.

In one or more embodiments of the invention, the production agent (230) manages the provisioning of backup services the virtual machines (210) based on instructions received from one or more remote agents. These instructions may cause production agent (230) to take action to provide the backup services.

In one or more embodiments of the invention, the instructions from remote agents specify that backups are to be generated dynamically. For example, instructions may specify that backups are to be generated in response to predetermined events rather than at a particular point in time. The predetermined event may be the storage of a predetermined quantity of data by an entity hosted by the example production host (200) after a predetermined point in time.

For example, consider a scenario in which a remote agent sends an instruction to a production agent that specifies that backups for a virtual machine hosted by the example production host (200) are to be generated whenever the virtual machine stores 200 Gigabytes (GB) of data. In response to this instruction, the production agent (230) may monitor, or otherwise set up watches for, the data storage of the virtual machine. When the data storage of the virtual machine reaches 200 GB, the production agent may initiate a backup generation for the virtual machine.

In one or more embodiments of the invention, the production agent (230) includes functionality to report backup generation activity to remote agents. For example, the production agent (230) may monitor backups that are generated and send notifications of the generated backups to the remote agents. By doing so, remote agents may be notified of the backup generations for the entities hosted by the example production host (200).

In one or more embodiments of the invention, the production agent (230) generates a virtual machine level backup catalog when a virtual machine level backup is generated. A virtual machine level backup catalog may be a data structure representing the information included in the generated backup. In other words, metadata regarding the virtual machine level backup that describes the contents of the virtual machine level backup. The virtual machine level backup catalog may specify the respective offsets to the start of files (or other discrete data structures), the length of files, the end points of files, file names, and/or other characteristics of files. Backup catalogs may be sent to backup storages. For additional details regarding the use of virtual machine level backup catalogs, refer to FIG. 3

In addition to backup generation, the provisioning of backup services provided by the production agent (230) may include performing restorations of the virtual machines (210) utilizing previously generated backups. Performing a restoration of a virtual machine may revert the virtual machine to a prior state associated with the backups used during the restoration. Thus, embodiments of the invention may improve the integrity of application data because the application data, if corrupted or lost, may be restored so long as appropriate backups have been generated. Accordingly, embodiments of the invention may improve data integrity in a distributed system by improving the likelihood that application data may be able to be restored.

In one or more embodiments of the invention, the production agent (230) performs restorations using point in time backups. As discussed above, a point in time backup may be a synthesized backup that has been generated using multiple backups. The point in time backup may facilitate the rapid instantiation of a virtual machine in a predetermined state (i.e., a state in which the virtual machine is able to provide access to desired data and/or applications hosted by the virtual machine). In contrast, instantiation of a virtual machine using multiple backups may be a time consuming process.

For example, to instantiate a virtual machine in a desired state using multiple backups, a virtual machine may first need to be instantiated in an undesirable state associated with virtual machine level backup. Then, one or more application level backups may be used to place applications into a desirable state by loading information from the application level backups. For many types of applications, such as databases, the process of placing such applications in their desirable state is highly computing resource intensive and time consuming. In many scenarios, applications such as databases must be rebuilt to be placed into desired states which consumes large amounts of time and computing resources. One or more embodiments of the invention may provide a time and/or computing resource efficient process for placing virtual machines and their hosted applications in desired states using point in time backups.

Figure 4:
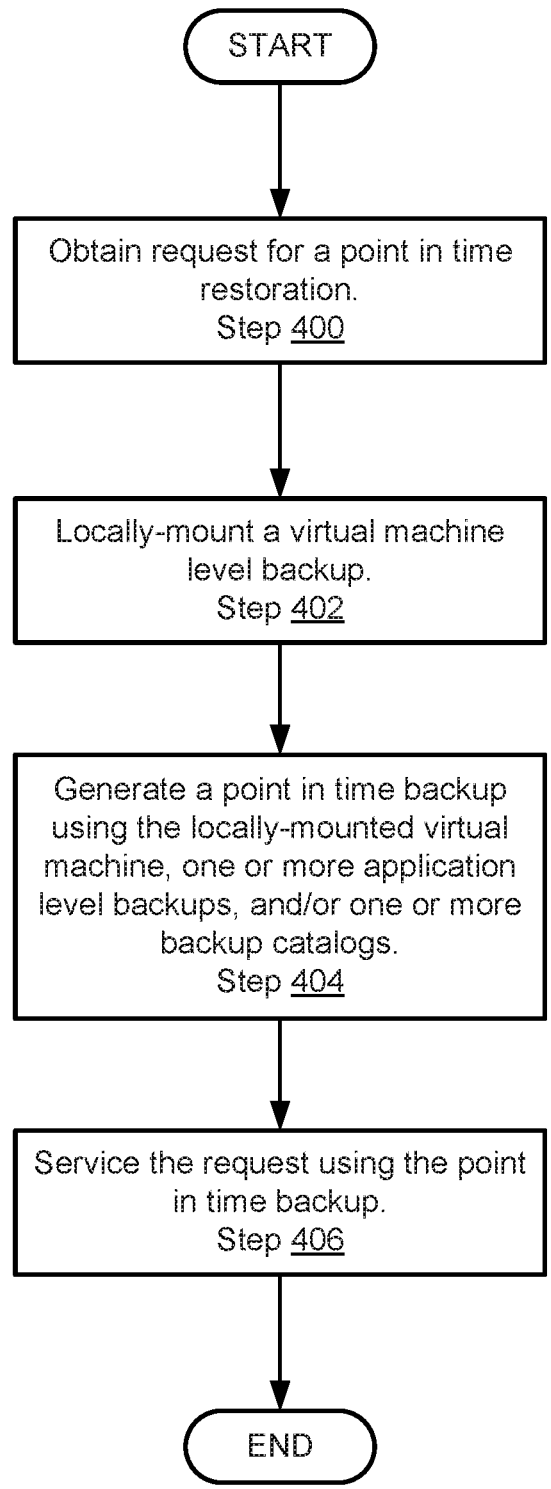
FIG. 4 shows a flowchart of a method of performing a restoration in accordance with one or more embodiments of the invention.
Figure 5:
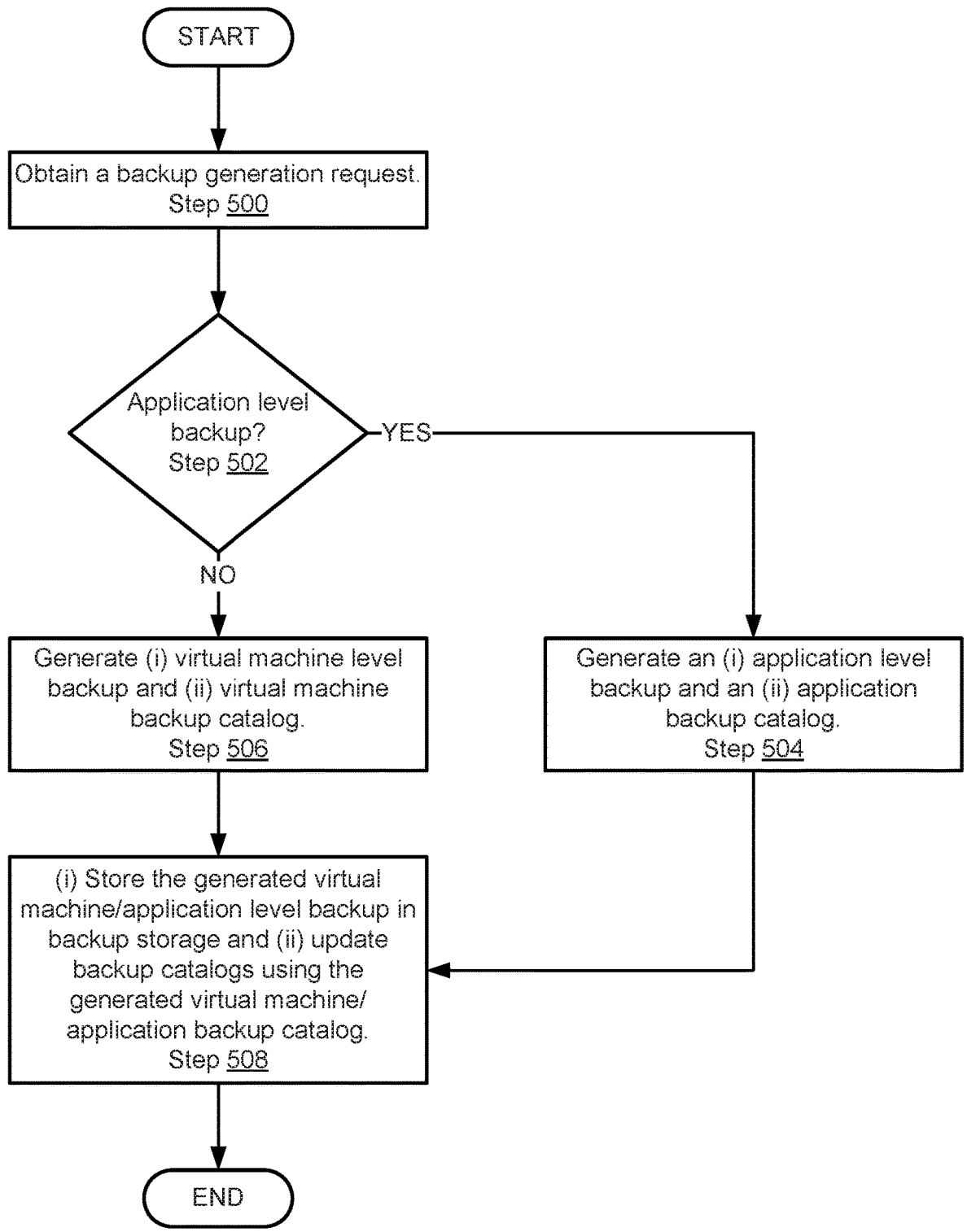
FIG. 5 shows a flowchart of a method of generating a backup in accordance with one or more embodiments of the invention.

To provide the above noted functionality of the production agent (230), the production agent (230) may perform all, or portion, of the methods illustrated in FIGS. 4-5.

In one or more embodiments of the invention, the production agent (230) is a hardware device including circuitry. The production agent (230) may be, for example, a digital signal processor, a field programmable gate array, or an application specific integrated circuit. The production agent (230) may be other types of hardware devices without departing from the invention.

In one or more embodiments of the invention, the production agent (230) is implemented as computing code stored on a persistent storage that when executed by a processor performs the functionality of the production agent (230). The processor may be a hardware processor including circuitry such as, for example, a central processing unit or a microcontroller. The processor may be other types of hardware devices for processing digital information without departing from the invention.

While the example production host (200) of FIG. 2.1 has been described and illustrated as including a limited number of components for the sake of brevity, a production host in accordance with embodiments of the invention may include additional, fewer, and/or different components than those illustrated in FIG. 2.1 without departing from the invention.

As discussed above, virtual machines hosted by the production host may provide services to clients. FIG. 2.2 shows a diagram of an example virtual machine (250) in accordance with one or more embodiments of the invention.

The example virtual machine (250) may host any number and type of applications (252). The applications (252) may provide services to clients and/or other entities. The applications (252) may generate application data (262) stored in persistent storage (260).

In one or more embodiments of the invention, the persistent storage (260) is a logical storage (e.g., virtualized storage) that utilizes any quantity of hardware storage resources of a production host (and/or other entity) that hosts the example virtual machine (250). For example, the persistent storage (260) may utilize portions of any combination of hard disk drives, solid state disk drives, tape drives, and/or any other physical storage medium of a production host and/or other entity for providing storage resources.

The example virtual machine (250) may also host any number of application backup agents (254). The application backup agents (254) may provide backup and/or restoration services for the applications (252). In other words, the application backup agents (254) may provide application level backup and/or restoration services, much like the production agent (230, FIG. 2.1) but at an application rather than virtual machine level. The application backup agents (254) may be separate from the applications (252) and/or native functionality of the applications (252).

The application backup agents (254) may provide backup and/or restoration services under the direction of a production agent or other entity. In other words, the actions of the application backup agents (254) may be orchestrated by other entities. For example, a production agent may send commands to the application backup agents (254) to invoke their functionality. In this manner, system level backup functionality may be orchestrated at different levels of granularity.

When generating backups, the application backup agents (254) may generate application data backups (264). Such backups may be data structures that reflect a state of an application (or a difference between the current a previous state) at a particular point in time. Application data backups (264) may be used to restore an application to a state associated with the application data backups (264). Once generated, copies of the application data backups (264) may be sent to backup storages for long term storage.

The application backup agents (254) may also generate application level backup catalogs (266) when an application data backup is generated. An application level backup catalog may be a data structure representing the information included in the generated application level backup. In other words, metadata regarding the application level backup that describes the contents of the application level backup may be generated. The application level backup catalog may specify the respective offsets to the start of different portions of the backup and/or other characteristics of the portions of the backups. Backup catalogs may be sent to backup storages. For additional details regarding the use of application level backup catalogs, refer to FIG. 3

Figure 3:
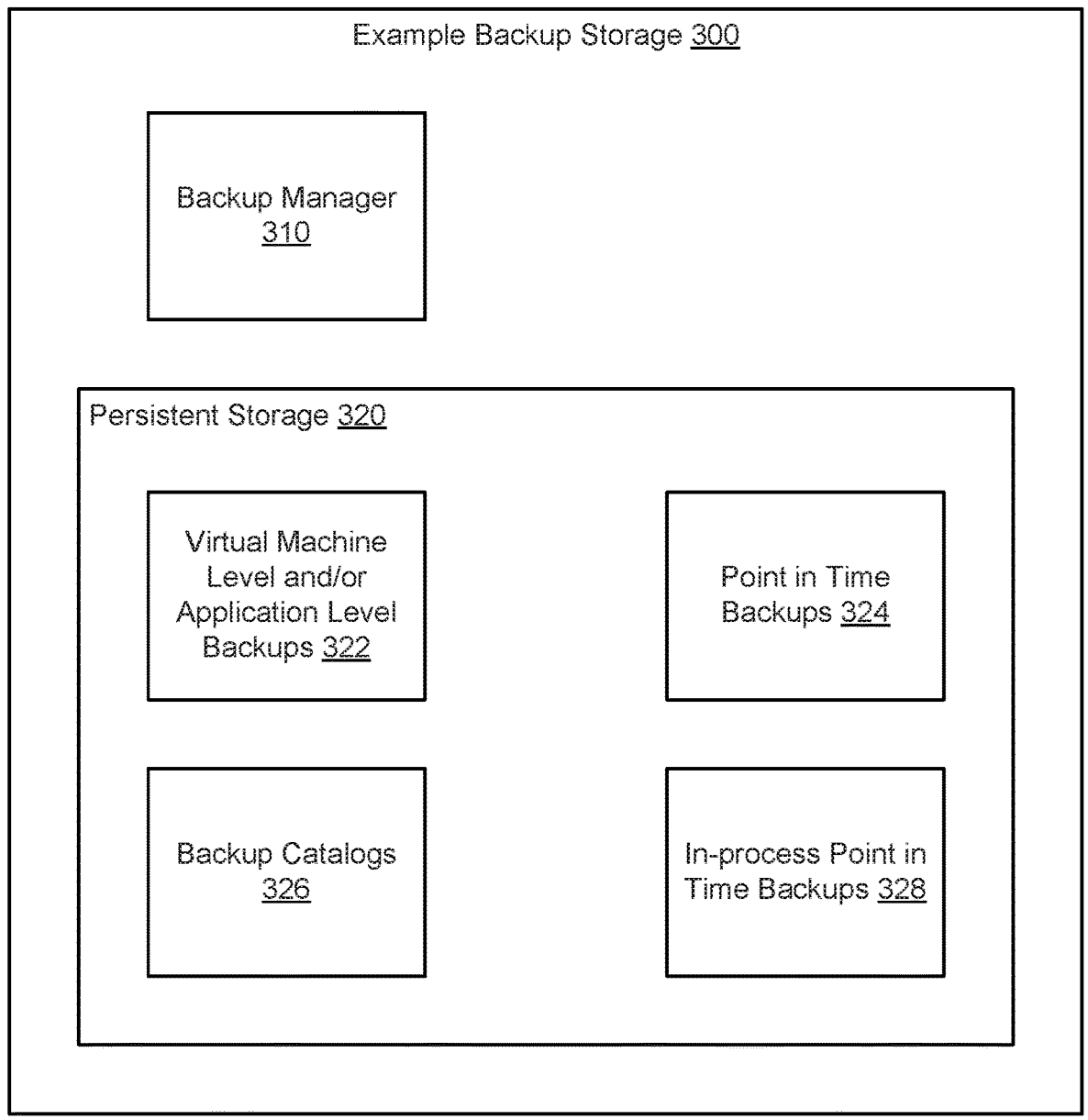
FIG. 3 shows a diagram of an example backup storage in accordance with one or more embodiments of the invention.

As discussed above, backups and/or backup catalogs may be sent to backup storages for data integrity purposes. FIG. 3 shows a diagram of an example backup storage (300) in accordance with one or more embodiments of the invention. The example backup storage (300) may be similar to any of the backup storages (120, FIG. 1). As discussed above, the example backup storage (300) may store data such as backups that may be used for restoration purposes.

To provide the aforementioned functionality of the example backup storage (300), the example backup storage (300) may include a backup manager (310) and a persistent storage (320). Each component of the example backup storage (300) is discussed below.

In one or more embodiments of the invention, the backup manager (310) provides data storage services and/or point in time backup generation services. For example, the backup manager (310) may orchestrate the storage of backups and/or backup catalogs from production hosts in persistent storage (320) resulting in the storage of virtual machine level and/or application level backups (322) as well as backup catalogs (326) associated with the virtual machine level and/or application level backups (322).

In one or more embodiments of the invention, the backup manager (310) provides point in time backup generation services to generate point in time backups (324). To provide point in time backup generation services, the backup manager (310) may synthesize point in time backups (324). Doing so may be a computationally expensive process and result in multiple in-process point in time backups (328) being concurrently generated at any point in time.

To synthesize a point in time backup, the backup manager (310) may combine any number of virtual machine level and/or application level backups (322) to obtain a point in time backup. For example, the backup manager (310) may overwrite portions of a virtual machine level backup using one or more application level backups. By doing so, the resulting point in time backup may reflect a virtual machine having a state associated with a first point in time that hosts an application (and associated application data) having a state associated with a second point in time.

To further clarify, consider a scenario in which a virtual machine level backup is generated at the first point in time and an application level backup is generated later, at the second point in time. It may be desirable to restore the application to its state associated with the second point in time. To do so conventionally, a virtual machine may be instantiated using the virtual machine level backup resulting in a virtual machine that hosts the application in its state associated with the first point in time, not the desired state. An application level backup may then be used by an application backup agent to restore a state of the application to its state associated with the second point in time. However, the aforementioned process is computationally expensive and time consuming.

In contrast, a point in time backup may be used to immediately restore the state of the application to the second state by instantiating the virtual machine using the point in time backup. Doing so dramatically reduces the computation cost and time required to perform the restoration because multiple restorations in serial need not be performed as may be required in a conventional process of performing a restoration.

To provide the above noted functionality of the backup manager (310), the backup manager (310) may perform all, or portion, of the methods illustrated in FIGS. 4-5.

In one or more embodiments of the invention, the backup manager (310) is a hardware device including circuitry. The backup manager (310) may be, for example, a digital signal processor, a field programmable gate array, or an application specific integrated circuit. The backup manager (310) may be other types of hardware devices without departing from the invention.

In one or more embodiments of the invention, the backup manager (310) is implemented as computing code stored on a persistent storage that when executed by a processor performs the functionality of the backup manager (310). The processor may be a hardware processor including circuitry such as, for example, a central processing unit or a microcontroller. The processor may be other types of hardware devices for processing digital information without departing from the invention.

In one or more embodiments of the invention, the persistent storage (320) is a data storage device. For example, the persistent storage (320) may be any combination of hard disk drives, solid state disk drives, tape drives, and/or any other physical storage medium for the storage of data.

In one or more embodiments of the invention, the persistent storage (320) stores the virtual machine level and/or application level backups (322), the point in time backups (324), the backup catalogs (326), and the in-process point in time backups (328).

While the example backup storage (300) of FIG. 3 has been described and illustrated as including a limited number of components for the sake of brevity, a backup storage in accordance with embodiments of the invention may include additional, fewer, and/or different components than those illustrated in FIG. 3 without departing from the invention.

Returning to FIG. 1, the backup storages may provide point in time restoration services. FIG. 4 illustrate methods may be performed by components of the system of FIG. 1 when providing such restoration services.

FIG. 4 shows a flowchart of a method in accordance with one or more embodiments of the invention. The method depicted in FIG. 4 be used to provide point in time restoration services in accordance with one or more embodiments of the invention. The method shown in FIG. 4 may be performed by, for example, a backup storage (e.g., 120, FIG. 1). Other components of the system illustrated in FIG. 1 may perform all, or a portion, of the method of FIG. 4 without departing from the invention.

While FIG. 4 is illustrated as a series of steps, any of the steps may be omitted, performed in a different order, additional steps may be included, and/or any or all of the steps may be performed in a parallel and/or partially overlapping manner without departing from the invention.

In step 400, a request for a point in time restoration is obtained.

In one or more embodiments of the invention, the request may be obtained from any entity illustrated in FIG. 1.

In one or more embodiments of the invention, the request is obtained from a remote agent. The remote agent may have determined that an application and/or application data hosted by a production host is of importance. To make the determination, the remote agent may have evaluated the frequency of access of application data and/or utilization of the services provided by the application by one or more clients.

For example, the remote agent may have calculated the relative usage rate of each of the applications hosted by the production hosts and determined that access to a particular application is of importance based on the relative usage rate.

In another example, the remote agent may have calculated relative access frequency of the application data hosted by each of the production hosts and determined that access to the particular application data is of importance based on the relative access rate of the particular application data.

In a still further example, the remote agent may have determined that restoration of a virtual machine and/or an application hosted by virtual machine is of importance for system-level functionality of the production hosts. For example, the remote agent may have determined that the virtual machine hosts a database utilized by other virtual machines and/or other applications. For the other virtual machines and/or applications to provide the functionality, it may have been important for functionality of the database to be restored to a particular point in time.

In one or more embodiments of the invention, the request for a point in time restoration specifies the state associated with an application. For example, the request may specify the most current state of the application.

In step 402, a virtual machine level backup is locally mounted.

In one or more embodiments of the invention, the virtual machine level backup may be locally mounted by instantiating a virtual machine using the virtual machine level backup. The virtual machine level backup may be locally mounted using high-performance computing resources of the backup storage. By doing so, the time for instantiating the virtual machine may be reduced when compared to instantiating the virtual machine in a production host and/or another entity.

In one or more embodiments of the invention, virtual machine level backup is locally mounted by storing the virtual machine level backup in high-performance storage. For example, the virtual machine level backup may be stored in a solid state disk drive of the backup storage. Prior to storage in a high-performance storage, virtual machine level backups may be stored in volume storage (e.g., low performance storage).

In step 404, a point in time backup is generated using the locally mounted virtual machine, one or more application level backups, and/or one or more backup catalogs.

In one or more embodiments of the invention, the point in time backup is generated by overwriting a portion of the virtual machine level backup using the one or more application level backups. For example, the location of application data within the virtual machine level backup that is associated with the one or more application level backups may be determined using the one or more backup catalogs. The application data may then be overwritten by storing the one or more application level backups and the location of the application data. By doing so, the state of the application data in the virtual machine level backup may be modified to reflect a state of the application data associated with the one or more application level backups. Thus, the synthesized backup that does not reflect the actual state of the virtual machine at any point in time may be generated. Rather, the portion of the virtual machine level backup associated with the application may be in a different state than other data of the virtual machine level backup. The modified virtual machine level backup may be used as the point in time backup.

In one or more embodiments of the invention, the point in time backup is generated by restoring an application hosted by the instantiated virtual machine using the one or more application level backups. In other words, the state of only the application hosted by the virtual machine may be modified. Once the application is restored, a virtual machine level backup of the instantiated virtual machine may be generated as the point in time backup.

In step 406, the request for the point in time restoration is serviced using the point in time backup.

In one or more embodiments of the invention, the request is serviced by providing a production host with remote access to the point in time backup. The production host may instantiate a virtual machine using the point in time backup. Once instantiated, the virtual machine may begin providing services to the clients. The services provided to the clients may reflect the state of the application rather than the state of other data used to instantiate the virtual machine.

In one or more embodiments of the invention, the request is serviced by sending the point in time backup to a production. The production host may instantiate a virtual machine using the point in time backup. Once instantiated, the virtual machine may begin providing services to the clients. The services provided to the clients may reflect the state of the application rather than the state of other data used to instantiate the virtual machine.

The method may end following step 406.

FIG. 5 shows a flowchart of a method in accordance with one or more embodiments of the invention. The method depicted in FIG. 5 be used to orchestrate backup generation in accordance with one or more embodiments of the invention. The method shown in FIG. 5 may be performed by, for example, a remote agent (e.g., 110, FIG. 1). Other components of the system illustrated in FIG. 1 may perform all, or a portion, of the method of FIG. 5 without departing from the invention.

While FIG. 5 is illustrated as a series of steps, any of the steps may be omitted, performed in a different order, additional steps may be included, and/or any or all of the steps may be performed in a parallel and/or partially overlapping manner without departing from the invention.

In step 500, a backup generation request is obtained.

In one or more embodiments of the invention, the backup generation request is obtained from a remote agent. The remote agent may send a request in accordance with the backup policy. The backup policy may specify when backups are to be generated.

In step 502, it is determined whether request is for an application level backup. The backup generation request may specify whether an application level backup for a virtual machine level backup is to be generated.

If it is determined that an application level backup is to be generated, the method may proceed to step 504. If it is determined that an application level backup is not to be generated, the method may proceed to step 506.

In step 504, both of (i) an application level backup and (ii) and an application backup catalog is generated.

In one or more embodiments of the invention, the application level backup is generated by sending a command to an application backup agent. Upon receipt, the application backup agent may initiate generation of an application level backup for the application.

In one or more embodiments of the invention, the application backup catalog is generated by mapping the application level backup. For example, metadata reflecting the structure of the application level backups may be generated. The backup catalog may specify the offsets to the start locations of various portions of the application level backup, the lengths of the various portions of the application level backups, and/or other information regarding the structure of the application level backup.

In step 508, (i) the generated virtual machine level backup or the generated application level backup is stored in backup storage and (ii) the backup catalogs are updated using the generated virtual machine backup catalog or the generated application backup catalog. In other words, the data structures generated in steps 504 or 506 are sent to the backup storages for storage.

The method may end following step 508.

Returning to step 502, the method may proceed to step 506 following step 502 if the backup generation request is not for an application level backup.

In step 506, both of (i) a virtual machine level backup and (ii) and a virtual machine backup catalog is generated.

In one or more embodiments of the invention, the virtual machine level backup is generated by sending a command to her production agent hosting the virtual machine implicated by the backup generation request. In other words, a backup manager may send a corresponding request backup generation for the production host that hosts the virtual machine for which a backup is to be generated. In response, the production agent may generate the virtual machine level backup based on the contents of the virtual machine.

In one or more embodiments of the invention, the virtual machine backup catalog is generated by mapping the virtual machine level backup. For example, metadata reflecting the structure of the virtual machine level backups may be generated. The virtual machine backup catalog may specify the offsets to the start locations of various portions (e.g., start location of files) of the virtual machine level backup, the lengths of the various portions of the virtual machine level backups, and/or other information regarding the structure of the virtual machine level backup.

The method may proceed to step 508 following step 506.

Using the method illustrated in FIG. 5, backups of virtual machines and/or applications may be generated in a manner that facilitates computationally efficient generation of point in time backups. For example, point in time backups may be generated by overwriting portions of virtual machine level backups using application level backups. The portions of the virtual machine level backups for overwriting purposes may be identified using the backup catalogs that specify the relevant offsets of the virtual machine level backups. By doing so, the computational cost for performing restorations of virtual machines, applications, and their corresponding data may be greatly reduced when compared to contemporary methods of performing restorations.

To further clarify embodiments of the invention, a non-limiting example is provided in FIGS. 6.1-6.7. Each of these figures may illustrate a system similar to that illustrated in FIG. 1 at different points in time during a backup generation process. The components of FIGS. 6.1-6.7 may be operably connected to each other and/or other entities via any combination of wired and/or wireless networks.

Example

Consider a scenario as illustrated in FIG. 6.1 in which a first production host (600) is hosting the virtual machine (602). The virtual machine (602) hosts a database (602.2) that is providing services to clients (not shown). A second production host (610) is not in use at this time.

A remote agent (630) is providing backup services to the first production host (600). At a first point in time, the remote agent (630) orchestrates the generation of a backup of the virtual machine (602) for storage and the backup storage (620). One sent to the backup storage (620), the virtual machine backup (622) is stored in the backup storage (620) as shown in FIG. 6.2.

At a second point in time, the remote agent (630) again instructs the first production host (600) to generate a backup. However, to reduce the storage space required for storing backup data, the remote agent (630) instructs the first production host (600) to generate an application backup of the database (602.2) rather than virtual machine backup. In response, the first production host (600) generates a database backup (624) and stores the backup in the backup storage (620) as illustrated in FIG. 6.3.

At third point in time, the remote agent (630) further instructs the first production host (600) to generate an additional application backup. In response, the first production host (600) generates a second database backup (626) and stores the backup in the backup storage (620) as illustrated in FIG. 6.4.

At a fourth point in time, the first production host (600) fails. In response to the failure of the first production host (600), the remote agent (630) evaluates the importance of the database (602.2) respect to overall system functionality. Based on the evaluation, the remote agent (630) determines that accelerated access to the database (602.2) is warranted. In response to the determination, the remote agent (630) sends an instruction to the backup storage (620) to generate a point in time backup for the database (602.2).

In response to the instruction, the backup storage (620) generates a point in time backup (628) by mounting the virtual machine backup (622) and overwriting the portion of the virtual machine backup (622) associated with the database (602.2) using the second database backup (626) as shown in FIG. 6.6. After generating the point in time backup (628), the backup storage (620) exposes the point in time backup (628) to the second production host (610) by providing remote access to the point in time backup (628).

In response to be provided access to the point in time backup (628), the second production host (610) instantiates a virtual machine (612) using the point in time backup (628) as shown in FIG. 6.7. By doing so, a new instance of the database (612.2) is also instantiated in a state that reflects the state of database of the now unavailable first production host in the state associated with the second database backup (626) rather than the state of the database associated with the virtual machine backup (622).

End of Example

Figure 7:
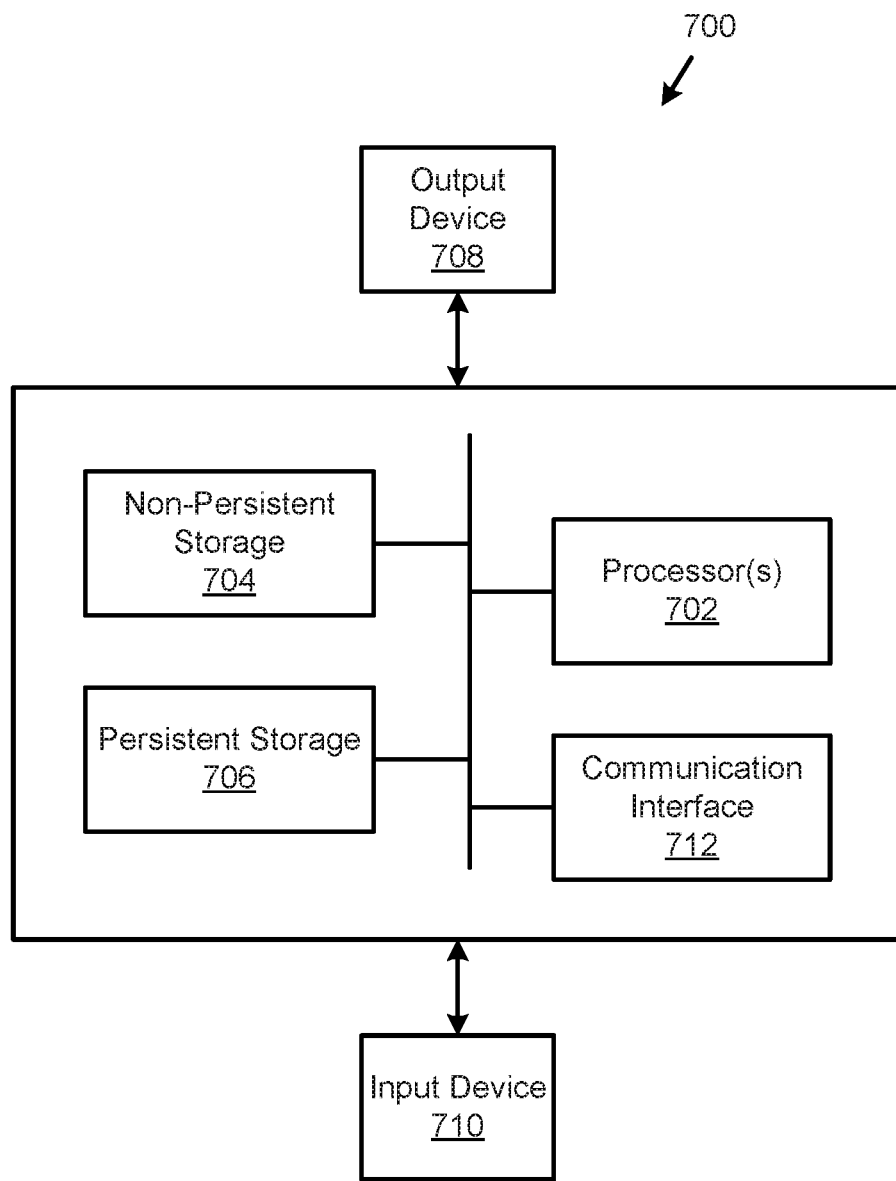
FIG. 7 shows a diagram of a computing device in accordance with one or more embodiments of the invention.

Any of the components of FIG. 1 may be implemented as distributed computing devices. As used herein, a distributed computing device refers to functionality provided by a logical device that utilizes the computing resources of one or more separate and/or distinct computing devices. As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may accelerate access to data in scenarios in which the entities hosting the data have become unavailable. For example, embodiments of the invention may provide a method for utilizing a synthesized backup, e.g., a point in time backup, that may reduce the time necessary for restoring an entity following a failure of the entity when compared to contemporary methods of restoring entities.

Thus, embodiments of the invention may address the problem of failure of components in a distributed system. By providing rapid access to data in response to components failure of a distributed system, the effective uptime of the distributed system may be improved.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:
1. A backup storage, comprising:
a persistent storage for storing:
virtual machine level backups, and
application level backups; and
a backup manager programmed to:
obtain a request for a point in time restoration of an application;

identify, based on the application, a virtual machine level backup of the virtual machine level backups that is associated with:
- a virtual machine that hosted an instance of the application, and
- a first point in time prior to a restoration point in time specified by the request for the point in time restoration;

identify, based on the application, an application level backup of the application level backups that is associated with the restoration point in time;

generate a point in time backup using:
- the identified virtual machine level backup, and
- the identified application level backup; and service the request using the point in time backup.

2. The backup storage of claim 1, wherein servicing the request using the point in time backup comprises:
exposing the point in time backup to file access by a production host.

3. The backup storage of claim 1, wherein servicing the request using the point in time backup comprises:
restoring a virtual machine using the point in time backup to obtain a restored virtual machine hosting the application in a state associated with the restoration point in time to obtain a restored virtual machine.

4. The backup storage of claim 3, wherein a state of the restored virtual machine is different from a state of the virtual machine upon which the identified application level backup is based.

5. The backup storage of claim 1, wherein generating the point in time backup comprises:
identifying a portion of the identified virtual machine level backup associated with the application; and
modifying the portion of the identified virtual machine level backup using the identified application level backup.

6. The backup storage of claim 5, wherein the identified virtual machine level backup is modified by overwriting the portion of the identified virtual machine level backup by the identified application level backup.

7. The backup storage of claim 5, wherein the portion of the identified virtual machine level backup is identified using a backup catalog that specifies offsets of different portions of data of the identified virtual machine level backup.

8. A method for restoring client access to an application, comprising:
obtaining a request for a point in time restoration of the application;
identifying, based on the application, a virtual machine level backup that is associated with:
- a virtual machine that hosted an instance of the application, and
- a first point in time prior to a restoration point in time specified by the request for the point in time restoration;
identifying, based on the application, an application level backup that is associated with the restoration point in time;
generating a point in time backup using:
- the identified virtual machine level backup, and
- the identified application level backup; and
servicing the request using the point in time backup.

9. The method of claim 8, wherein servicing the request using the point in time backup comprises:
exposing the point in time backup to file access by a production host.

10. The method of claim 8, wherein servicing the request using the point in time backup comprises:
restoring a virtual machine using the point in time backup to obtain a restored virtual machine hosting the application in a state associated with the restoration point in time to obtain a restored virtual machine.

11. The method of claim 10, wherein a state of the restored virtual machine is different from a state of the virtual machine upon which the identified application level backup is based.

12. The method of claim 8, wherein generating the point in time backup comprises:
identifying a portion of the identified virtual machine level backup associated with the application; and
modifying the portion of the identified virtual machine level backup using the application level backup.

13. The method of claim 12, wherein the identified virtual machine level backup is modified by overwriting the portion of the identified virtual machine level backup by the identified application level backup.

14. The method of claim 12, wherein the portion of the identified virtual machine level backup is identified using a backup catalog that specifies offsets of different portions of data of the identified virtual machine level backup.

15. A non-transitory computer readable medium comprising computer readable program code, which when executed by a computer processor enables the computer processor to perform a method for restoring client access to an application, the method comprising:
obtaining a request for a point in time restoration of the application;
identifying, based on the application, a virtual machine level backup that is associated with:
- a virtual machine that hosted an instance of the application, and
- a first point in time prior to a restoration point in time specified by the request for the point in time restoration;
identifying, based on the application, an application level backup that is associated with the restoration point in time;
generating a point in time backup using:
- the identified virtual machine level backup, and
- the identified application level backup; and
servicing the request using the point in time backup.

16. The non-transitory computer readable medium of claim 15, wherein servicing the request using the point in time backup comprises:
exposing the point in time backup to file access by a production host.

17. The non-transitory computer readable medium of claim 15, wherein servicing the request using the point in time backup comprises:
restoring a virtual machine using the point in time backup to obtain a restored virtual machine hosting the application in a state associated with the restoration point in time to obtain a restored virtual machine.

18. The non-transitory computer readable medium of claim 17, wherein a state of the restored virtual machine is different from a state of the virtual machine upon which the identified application level backup is based.

19. The non-transitory computer readable medium of claim 15, wherein generating the point in time backup comprises:
identifying a portion of the identified virtual machine level backup associated with the application; and modifying the portion of the identified virtual machine level backup using the identified application level backup.

20. The non-transitory computer readable medium of claim 19, wherein the identified virtual machine level backup is modified by overwriting the portion of the identified virtual machine level backup by the identified application level backup.

\* \* \* \* \*